United States Patent
Zheng et al.

(12) 
(10) Patent No.: US 11,215,738 B2
(45) Date of Patent: *Jan. 4, 2022

(54) ANTISTATIC FILM AND LAMINATION THEREOF

(71) Applicant: ESSILOR INTERNATIONAL, Charenton-le-Pont (FR)

(72) Inventors: Haipeng Zheng, Dallas, TX (US); Ronald A. Berzon, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 197 days.

This patent is subject to a terminal disclaimer.

(21) Appl. No.: 15/781,383

(22) PCT Filed: Dec. 4, 2015

(86) PCT No.: PCT/EP2015/078676
§ 371 (c)(1),
(2) Date: Jun. 4, 2018

(87) PCT Pub. No.: WO2017/092826
PCT Pub. Date: Jun. 8, 2017

(65) Prior Publication Data
US 2018/0356566 A1 Dec. 13, 2018

(51) Int. Cl.
*G02B 1/16* (2015.01)
*G02B 5/30* (2006.01)

(52) U.S. Cl.
CPC .............. *G02B 1/16* (2015.01); *G02B 5/3033* (2013.01)

(58) Field of Classification Search
None
See application file for complete search history.

(56) References Cited

U.S. PATENT DOCUMENTS

| | | | |
|---|---|---|---|
| 4,203,769 A * | 5/1980 | Guestaux | B65D 65/42 430/631 |
| 4,997,697 A | 3/1991 | Malhotra | |
| 5,472,833 A | 12/1995 | Havens et al. | |
| 5,830,983 A * | 11/1998 | Alex | C08L 71/02 528/322 |
| 5,895,724 A | 4/1999 | Teegarden et al. | |
| 9,133,348 B2 | 9/2015 | Feret et al. | |
| 2007/0247710 A1 | 10/2007 | Nakashima et al. | |
| 2008/0268215 A1* | 10/2008 | Hattori | G02B 1/16 428/212 |
| 2010/0253886 A1 | 10/2010 | Kim et al. | |
| 2011/0268935 A1 | 11/2011 | Suzuki et al. | |
| 2013/0040124 A1 | 2/2013 | Koo et al. | |
| 2013/0052434 A1 | 2/2013 | Asahi et al. | |
| 2014/0004333 A1 | 1/2014 | Burger | |
| 2014/0106122 A1 | 4/2014 | Eguchi et al. | |
| 2016/0340559 A1* | 11/2016 | Jiang | C09J 7/25 |

FOREIGN PATENT DOCUMENTS

| | | |
|---|---|---|
| CN | 104375230 | 2/2015 |
| CN | 105103009 | 11/2015 |
| WO | WO 2006/054888 | 5/2006 |
| WO | WO 2012/093995 | 7/2012 |

OTHER PUBLICATIONS

International Search Report and Written Opinion issued in International Patent Application No. PCT/EP2015/078676, dated Sep. 23, 2016.
Official Communication Issued in Corresponding Chinese Patent Application No. 201580085269.7, dated Dec. 12, 2019.

* cited by examiner

*Primary Examiner* — Sheeba Ahmed
(74) *Attorney, Agent, or Firm* — Norton Rose Fulbright US LLP

(57) ABSTRACT

Antistatic laminate film structures comprising a transparent support structure and an antistatic (AS) layer comprising at least one antistatic component are described herein. The antistatic laminate film structures may comprise a cellulose triacetate support structure, a polyvinyl alcohol polarizing element, and an enhancing or neutral layer.

20 Claims, No Drawings

ANTISTATIC FILM AND LAMINATION THEREOF

CROSS-REFERENCE TO RELATED APPLICATIONS

This application is a national phase application under 35 U.S.C. § 371 of International Application No. PCT/EP2015/078676 filed 4 Dec. 2015, the entire contents of which is specifically incorporated by reference herein without disclaimer.

FIELD OF THE INVENTION

This invention relates to a process for making an antistatic film structure comprising a transparent support structure and an antistatic layer comprising at least one antistatic component.

BACKGROUND

During the manufacture of structured film laminates, which are primarily composed of insulating materials, localized static charges may accumulate at the laminate layer surface. These localized static charges are capable of attracting small, lightweight foreign particles such as dust particles. As a result of the electrostatic attraction between foreign particles and the laminate layer surface, foreign particles cling to and accumulate on the laminate layer surface.

As successive layers are added to a structure film laminate during assembly, clinging foreign particles are incorporated between laminate layers. The integrated foreign particles disperse light passing through the laminate, thereby increasing haze and reducing optical clarity. It is therefore desirable for no foreign particles to be attracted to laminate layer surfaces during the assembly of a structured film laminate.

In order to prevent or reduce attraction of foreign particles during manufacturing, an antistatic (AS) layer may be incorporated within or coated onto a structured film laminate. AS substances prevent or reduce static charge buildup by increasing charge mobility, i.e., conductance. When a conductive AS substance is positioned at the surface of an otherwise non-conductive structured film laminate, localized charge accumulation at the laminate surface is reduced or altogether eliminated. The reduction in localized charge buildup results in a structured film laminate which does not attract foreign particles. The AS substance may also impart AS features to the final structured film laminate product.

In order to be useful for the production of transparent structured film laminates, an AS substance must have high optical transparency. Known optically transparent AS coatings include metal oxides, conductive polymer films, and carbon nanotube (CNT) based composite films. Manufacturers of transparent films have employed these transparent compositions for conferring AS properties to the films. U.S. Pat. No. 4,203,769 discloses radiation-sensitive elements, such as photographic film, coated by an AS composition comprising at least 80 wt % vanadium pentoxide. U.S. Pat. No. 4,997,697 discloses transparencies for electrographic and xerographic imaging comprising an AS cellulosic polymer layer coated on the top and bottom surface. U.S. Pat. No. 5,472,833 discloses a photographic film comprising an AS vanadium pentoxide layer sandwiched between two cellulose triacetate (TAO) layers, and a second AS vanadium pentoxide layer on an outer surface of one of the TAC layers. U.S. Pat. No. 5,895,724 discloses a recyclable photographic film comprising a cellulose acetate support layer coated with an AS layer and a polymeric acrylate-based barrier layer. WO 2006054888 discloses radiation-curable, AS laminate compositions for coating display screens and optical lenses. The coating compositions are rendered AS by the inclusion of a metal oxide, metal nitride, metal sulfide, metal phosphide, metal carbide, metal boride, or metal selenide nanoparticle. US Patent Publication No. 20070247710 discloses a laminate with an AS layer provided between a polarizing element and a light-transparent base material. US Patent Publication No. 20100253886 discloses a polarizing film comprising a resin film base layer, a polarizer, and an AS coating layer comprising a cured mixture of a conductive polyethylene dioxythiophene/polystyrenesulfonate polymer, a curable resin, a hydroxyacrylate compound, a cellulose compound, and a photopolymerization initiator. US Patent Publication No. 20110268935 discloses an AS laminate comprising a support coated with an AS layer with varying local concentrations of a conductive polymer. US Patent Publication No. 20130040124 discloses a transparent AS film comprising conductive particles of single-layer or multi-layer graphene. US Patent Publication No. 20140004333 discloses an AS coating comprising a fluoropolymer with ionizable groups such as sulfate, carboxylate, and phosphate in their protonated forms. U.S. Pat. No. 9,133,348 discloses AS sol/gel compositions comprising a Si(X)n-polyalkylene oxide hydrolyzate. WO 2012093995 discloses AS UV-cured hard-coatings, comprising an anhydrous solution of non-hydrolyzed epoxyalkyl trialkoxysilane and at least one photoinitiator selected from the group consisting of triarylsulfonium salts, diaryliodonium salts or mixtures thereof.

As ophthalmic technologies advance and product quality becomes an integral part of product branding, there is a need to manufacture the high quality structured film laminates with exceptional optical qualities. It is an objective to provide structured film laminates comprising surfaces with little to no attraction to foreign particles. It is desirable that no foreign particles be attracted to the surfaces involved during the manufacturing and to the final ophthalmic product.

SUMMARY

In some aspects, an AS laminate film structure comprising a transparent support layer structure and an AS layer is provided. The AS laminate film structure may comprise at least one AS component selected from the group consisting of graphene, single or multi-wall native or derivatized carbon nanotubes, semiconducting materials, core-shell conductive nanoparticles, organic conductive materials or polymers or co-polymers thereof, organic ionic salts or inorganic ionic salts or materials, conductive colloids, acrylate materials, ionic resins, and mixtures thereof.

The transparent support structure may comprise a polymer selected from the group consisting of native or derivatized cellulose or cellulosic material, polyesters, polyvinyl acetates, polyacrylonitriles, polybutadienes, polystyrenes, polycarbonates, polyacrylates, copolymers and mixtures thereof. The derivatized cellulose may be selected from the group consisting of cellulose alkyl ethers, cellulose hydroxyalkyl ethers, cellulose esters, cellulose functionalized with anionic or cationic functional groups, crosslinked cellulose, and combinations thereof. In particular embodiments, the cellulose ester is TAC.

In some embodiments, the AS film structure further comprises a polarizing element. In particular embodiments, the polarizing element comprises polyvinyl alcohol film. In some embodiments, the at least one AS component comprises an the inorganic ionic material. The inorganic ionic salt or material comprises vanadium oxide, antimony oxide, tantalum oxide, cerium oxide, tin oxide, titanium oxide, indium oxide, zinc oxide, tin-doped indium oxide, antimony-doped tin oxide, fluorine-doped tin oxide, phosphorus-doped tin oxide, zinc antimonide, indium antimonide, indium-doped zinc oxide, lithium salts, silver, gold, nickel, aluminum, silicon nitride, or magnesium fluoride, or combinations thereof. In further embodiments, the inorganic ionic material may comprise a metal oxide selected from the group consisting of vanadium oxide, antimony oxide, tin oxide, titanium oxide, indium oxide, silver oxide, gold oxide, aluminum oxide, zinc oxide, lithium oxide, and combinations thereof. The metal oxide may be any known oxide of the corresponding metal. For example, the vanadium oxide inorganic ionic material may be selected from vanadium (II) oxide (VO), vanadium (III) oxide ($V_2O_3$), vanadium (IV) oxide ($VO_2$), and vanadium (V) oxide ($V_2O_5$).

In some aspects, the AS film structure may comprise a substrate or coating that enhances the AS performance. In some embodiments, an enhancing layer may comprise an additive to enhance AS performance. In some aspects, the enhancing layer additive may comprise diethylene glycol, diethylene glycol monoether, diethylene glycol diether, their oligomers or polymers, or any combination thereof. In some aspects, the enhancing layer additive is added in an amount ranging from 1-10 wt % of the enhancing layer, more preferably from 2-5 wt %. In some aspects, the AS film structure may comprise a neutral layer that inhibits or prevents negative influence from a laminate layer or substrate.

In some embodiments, the AS film structure comprises a relative light transmission factor in the visible spectrum, Tv, preferably greater than 85%, more preferably greater than 90%. In some aspects, the AS layer of the AS film structure comprises a thickness ranging from 100 nm to 2 µm, more preferably from 50 nm to 1.5 µm, even more preferably from 5 nm to 1 µm. In some embodiments, the AS film structure comprises a haze value of less than 1.0%, preferably less than 0.5%.

In some embodiments, the AS layer is a soft or hard AS coating. The AS layer may comprise colloidal silica or a multifunctional crosslinking monomer. The amount of colloidal silica or multifunctional crosslinking monomer may be adjusted to alter the hardness of the AS layer. In some embodiments, the AS coating is a UV-curable coating.

In some aspects, the AS laminate film further comprises a hard or soft AS coating. The AS coating may comprise colloidal silica or a multifunctional crosslinking monomer. The amount of colloidal silica or multifunctional crosslinking monomer may be adjusted to alter the hardness of the AS layer. In some embodiments, the AS coating is a UV-curable coating.

In other aspects, a method for producing an AS film structure is provided. In some aspects, the method comprises combining a transparent support structure and an AS layer comprising at least one AS component selected from the group consisting of graphene, single or multi-wall native or derivatized CNTs, semiconducting materials, core-shell conductive nanoparticles, organic conductive materials or polymers or co-polymers thereof, organic ionic salts or inorganic ionic salts or materials, conductive colloids, ionic resins, and mixtures thereof.

In some embodiments, the method comprises applying the AS layer to the transparent support structure by spray coating, dip coating, spin-coating, flow coating, ink-jetting, painting, printing, sputtering, plasma depositing, electrochemical vapor depositing, or vacuum depositing AS material onto the transparent support structure. In some embodiments, the transparent support structure comprises a polymer selected from the group consisting of native or derivatized cellulose, polyesters, polyvinyl acetates, polyacrylonitriles, polybutadienes, polystyrenes, polycarbonates, polyacrylates, copolymers and mixtures thereof. In a particular embodiment, the derivatized cellulose is TAC.

The method for producing an AS film structure may further comprise combining a polarizing element with the AS film structure. In a particular embodiment, the polarizing element preferably comprises polyvinyl alcohol film. In some embodiments, the AS film structure further comprises one or more abrasion-and/or scratch-resistant layers. The abrasion- and/or scratch-resistant layer is defined as a coating which improves the abrasion- and/or scratch-resistance of the finished film structure as compared to a same film structure without the abrasion- and/or scratch-resistant layer. Any known optical abrasion- and/or scratch-resistant coating composition may be used herein. Examples of abrasion- and/or scratch-resistant layers are (meth)acrylate based coatings and silicon-containing coatings. (Meth)acrylate based coatings are typically UV-curable. The term (meth)acrylate means either methacrylate or acrylate. The main component of a (meth)acrylate based curable coating composition may be chosen from monofunctional (meth)acrylates and multifunctional (meth)acrylates such as difunctional (meth)acrylates; trifunctional (meth)acrylates; tetrafunctional (meth)acrylates, pentafunctional (meth)acrylates, hexafunctional (meth)acrylates. Other ingredients can include colloidal silicas or surface modified colloidal silicas, photoinitiators, and surfactants. Examples of monomers which may be used as main components of (meth)acrylate based coating compositions are:

1) monofunctional (meth)acrylates: glycidyl methacrylate, allyl methacrylate, 2-ethoxyethyl acrylate, 2-ethoxyethyl methacrylate, caprolactone acrylate, isobornyl methacrylate, lauryl methacrylate, and polypropylene glycol monomethacrylate.

2) difunctional (meth)acrylates: 1,4-butanediol diacrylate, 1,4-butanediol dimethacrylate, 1,6-hexanediol diacrylate, 1,6-hexanediol dimethacrylate, ethoxylated bisphenol A diacrylate, polyethylene glycol di(meth)acrylates such as polyethylene glycol diacrylate, tetraethylene glycol diacrylate, polyethylene glycol dimethacrylate, polyethylene glycol diacrylate, tetraethylene glycol diacrylate, tripropylene glycol diacrylate, neopentyl glycol diacrylate, tetraethylene glycol dimethacrylate, and diethylene glycol diacrylate.

3) trifunctional (meth)acrylates: trimethylolpropane trimethacrylate, Trimethylolpropane triacrylate, pentaerythritol triacrylate, ethoxylated trimethylolpropane triacrylate, and trimethylolpropane trimethacrylate.

4) tetrafunctional to hexafunctional (meth)acrylates: dipentaerythritol pentaacrylate, pentaerythritol tetraacrylate, ethoxylated pentaerythritol tetraacrylate, and pentaacrylate esters.

Silicon-containing abrasion- and/or scratch-resistant coatings are preferably sol-gel coatings, which may be obtained by curing a precursor composition containing silanes or hydrolyzates thereof. The sol-gel silicon based coating compositions which may be used are homogeneous mixtures of a solvent, a silane and/or an organosilane, option ally a surfactant, and optionally a catalyst which are processed to form a coating suitable for optical application. The term "homogeneous" as used herein refers to a form which has a uniform or similar structure throughout and is given the ordinary meaning known to persons skilled in the art. In some embodiments, the abrasion- and/or scratch-resistant coatings are epoxytrialkoxysilane-based hard coatings, or more particularly y-glycidoxypropyl-trimethoxysilane-based hard coatings.

The AS film structure substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis (allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Particular materials for the lens substrate are polycarbonates and diethylene glycol bis(allyl carbonate) copolymers, in particular substrates made of polycarbonate.

CNTs contained in the AS composition refer to tubular structures grown with a single wall or multi-wall, comprising primarily $sp^2$-hybridized carbon atoms. The CNTs preferably have a diameter on the order of half nanometer to less than 10 nanometers. CNTs can function as either an electrical conductor, similar to a metal, or a semiconductor, according to the orientation of the hexagonal carbon atom lattice relative to the tube axis and the diameter of the tubes.

Nanoparticles are particles with a diameter (or longest dimension) less than 1 µm, preferably less than 150 nm and more preferably less than 100 nm.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A. AS layer deposited on substrate by wet processes

In some embodiments, an AS layer is applied to a substrate by any appropriate wet process, such as a dip, spin, spray, or flow coat process. In some embodiments, the AS layer may be applied by a series of successive layers or thin coats onto the substrate to achieve the desired thickness.

The AS layer may be comprised of AS or conductive materials. In some embodiments, the AS layer comprises a matrix with AS, conductive, or semi-conductive material fillers. In some embodiments, the AS layer comprises AS, conductive, or semi-conductive material, and a binder.

Conductive fillers include, but are not limited to, conductive polymers; CNTs or graphenes; or colloids or coreshells comprising indium tin oxide (ITO), antimony-doped tin oxide (ATO), $SnO_2$, $V_2O_5$ or $Sb_2O_3$, Au, Ag, Zn, ZnO, and doped $Al_2O_3$, for example. AS or semi-conducting fillers include, but are not limited to, organic-inorganic ion salts like N-lithiotrifluoromethane sulfonamide, and triarylsulfonium salts. A matrix or binder may comprise a crosslinked silane, polyurethane, epoxy, or acrylate, or mesoporous structures. In some embodiments, a matrix or binder is set by a thermal curing or UV curing process. In some cases, additives such as diethylene glycol, diethylene glycol monoether, diethylene glycol diether, their oligomers or polymers, or combinations thereof may be added to an AS layer. This additive may be added in any appropriate amount, including but not limited an amount ranging from 1 to 10 wt %, and preferably from 2 to 5 wt %. The additive may enhance the AS performance of an AS layer.

Conductive polymers include, but are not limited to, polythiophene, thiophene-thiazolothiazole copolymers, regioregular poly(3-alkylthiophene) conducting block copolymers, poly(thiophene-3-alkanoic acid), polyaniline, polyphenylene, polyphenylene vinylene, polypyrrole, and polyacetylene. In some embodiments, an ionomer may be employed as a conductive polymer. CNTs include single-wall, multi-wall CNTs, surface modified CNTs, or CNTs linked to conductive or conjugated polymers, such as a thiophene-containing polymer.

In a dip coating process, a substrate is dipped into a liquid composition and simultaneously receives a layer of coating on each surface. The substrate may be cleaned using ultrasonic activated chemistry, then immersed in the liquid coating bath. The withdrawal speed of the substrate from the coating bath may be altered to control the thickness of the final coating. The thickness may also be a function of the coating bath viscosity. The coating may then be cured.

In a spin coating or centrifugation process, a substrate is attached to a rotary support. The substrate is rotated at a controlled speed, and a measured amount of the coating composition is applied to the spinning substrate. The rotation speed is accelerated until a uniform coating composition film is obtained by centrifugation. In a spray coat process, melted (or heated) materials or solutions or dispersions of materials are sprayed onto a surface. In a flow coating process, a coating flows over a substrate controlled by gravity. Excess coating is collected, and may be filtered, and combined with a fresh coating and/or a solvent, and may then be re-used.

B. AS enhancing layer coated between AS layer and substrate

An AS enhancing layer may be employed to augment the AS activity of the AS layer. An AS enhancing layer may be applied on top of, or subjacent to an AS layer. The AS enhancing layer can positively affect the AS layer performance in a structured film laminate. The AS enhancing layer may be comprised of siloxanes, non-conductive metal oxides, nanoparticles like $SiO_2$ or $Al_2O_3$, or poly(ethylene glycol) copolymers. Additives such as diethylene glycol, diethylene glycol monoether, diethylene glycol diether, their oligomers or polymers, or combinations thereof may be added into the AS enhancing layer.

C. Neutral layer coated between AS layer and substrate

A neutral layer may be applied between an AS layer and a substrate. The neutral layer may disconnect any influences of the substrate on the AS layer performance. Allyl diglycol carbonate is one example of a neutral layer.

D. Flexible metal oxide, conductive polymer, or CNT coating/film layer on substrate deposited by dry processes Some AS layer compositions may be applied to a substrate by a dry process. Examples of AS layer compositions that may be applied by a dry process include, but are not limited to metal oxides, conductive polymers, carbon nanotubes, and graphene films. Dry process include chemical vapor deposition techniques and variations thereof, plasma deposition, and physical vapor deposition techniques, such as sputtering.

A conductive polymer AS film layer, such as polyacetylene, polyphenylene vinylene, polypyrrole, polythiophene, polyaniline or polyphenylene sulfide, may be formed by an oxidative chemical vapor deposition (oCVD). In some aspects, an AS film layer may comprise poy(3,4-ethylenedioxythiophene) (PEDOT) monomers or oligomers deposited by chemical vapor deposition. Other conductive polymeric films known in the art may be may be employed as an AS composition. Conductive polymers may be applied as an AS layer through surface grafting. End-functionalized conductive polymers may be grafted to a substrate. The grafting process may be used to apply conductive oligomer or monomers as well. After surface grafting, a thin polymeric, oligomeric, or monomeric brush layer is formed on the substrate.

Various chemical vapor deposition (CVD) techniques may be used to apply CNTs and graphene. In the CVD process, a substrate is placed inside a vacuum chamber, which dictates the maximum size of objects that can be coated. Then, the coating material is heated, or the pressure around it is reduced until the material vaporizes, either inside the vacuum chamber or in an adjacent area from which the vapor can be introduced. There, the suspended material begins to settle onto the substrate material and form a uniform coating. A number of modified-CVD techniques may be employed herein to apply various AS compositions to a substrate.

AS transparent metal oxide ZnO film layer may be synthesized by the reaction of diethyl zinc with methanol by dual-source aerosol-assisted chemical vapor deposition. An AS film layer of fluorine-doped ZnO can be made by atmospheric pressure chemical vapor deposition.

Aerosol-assisted CVD may be used to apply a variety of different metal oxide AS compositions to a substrate. For example, tantanum-doped $TiO_2$ AS films may be produced by the CVD reaction of $Ti(OEt)_4$ and $Ta(OEt)_5$.

Graphene AS film layers may be fabricated by roll-to-roll CVD, where a pair of roll-to-roll winder and unwinder systems are incorporated with a CVD system. Ambient pressure chemical vapor deposition may be used to apply graphene and other AS compositions to a substrate. Surface wave plasma chemical vapor deposition, a relatively low-temperature (300-400° C.) large-area method, uses electrical energy to generate a glow discharge (plasma) in which the energy is transferred into a gaseous mixture of the AS composition. This transforms the gaseous mixture into reactive radicals, ions, neutral atoms and molecules, and other highly excited species. These atomic and molecular fragments interact with a substrate and deposit onto the substrate.

Electrochemical vapor deposition is a modified form of CVD which utilizes an electrochemical potential gradient to grow thin, gas tight layers of AS materials on substrates.

Sputtering may be used to deposit various AS compositions onto a substrate. Sputtering is a versatile physical vapor deposition (PVD) method whereby particles are ejected from a solid target material due to bombardment of the target by energetic particles. Sputtered conductive AS film layers, including ITO, ZnO, & ZnO—$In_2O_3$, exhibit high optical clarity and maximum light transmission & conductivity. Sputtered AS film layers may be made by radio frequency (RF) sputtering, or an opposed direct current (DC) planar magnetron sputtering system. Nano-structured transparent conductive films including $TiO_2$/ITO & $SiO_x$/ITO nano-multilayer films & multilayer ITO films are grown by rotational-sequential-sputtering.

A substrate surface may be coated with an AS layer by employing a plasma process. Treatment of an AS composition and/or a substrate surface with a plasma generates chemically-reactive species. Reactions between the substrate surface and AS species result in a substrate coated with an AS layer.

E. AS coating on substrate, deposited in multiple steps

Indium tin oxide or other conductive nanoparticles or CNTs may first be deposited on a substrate, then covered by a binder layer. A stabilizing layer may then be applied over the binding layer. The stabilizing layer may be a crosslinkable thermoset, thermoplastic, sol-gel, aero-gel, or a photochromic gel.

F. AS adhesive

An AS adhesive may be synthesized by mixing one or more AS components with existing adhesive layers. The adhesive may be dip, spin, spray or flow coated on a substrate or laminate layer before successive layers are applied. The adhesive may comprise a coating matrix or a binder. A coating matrix or a binder can be crosslinked silane, polyurethane, epoxy, or acrylates, or mesoporous structures, made by thermal curing or UV curing process. An AS component selected from the group consisting of graphene, single or multi-wall native or derivatized CNTs, semiconducting materials, core-shell conductive nanoparticles, organic conductive materials or polymers or co-polymers thereof, organic or inorganic ionic salts or materials, conductive colloids, ionic resins, and mixtures thereof may be added to the coating matrix or binder. In some cases, diethylene glycol, diethylene monoether, diethylene diether, or polyethylene may be used as an additive at 1-10 wt %, and preferably from 2-5 wt %.

G. UV-curable AS coating

In some embodiments, the AS laminate film further comprises a UV-curable AS coating. In some aspects, the AS layer is a UV-curable AS coating. One method for applying a UV-curable AS coating comprises the steps of coating an organic or mineral optical substrate with an essentially anhydrous solution containing from 5% to 90% by weight, relative to the total dry matter of the solution, of at least one non-hydrolyzed epoxyalkyl trialkoxysilane and at least about 3.2% by weight, relative to the total dry matter of the solution, of at least one photoinitiator selected from the group consisting of triarylsulfonium salts, diaryliodonium salts, and mixtures thereof. The coating is then cured by irradiation with UV-radiation. The non-hydrolyzed epoxyalkyl trialkoxysilane is not hydrolyxed prior to the UV curing step.

The coating may comprise colloidal silica or multifunctional crosslinking monomer. The coating hardness may be adjusted by altering the amount of colloidal silica or multifunctional crosslinking monomer.

The claims are not to be interpreted as including means-plus- or step-plus-function limitations, unless such a limitation is explicitly recited in a given claim using the phrase(s) "means for" or "step for," respectively.

The invention claimed is:

1. An antistatic laminate film structure comprising a transparent support structure and an antistatic layer comprising at least one antistatic component selected from the group consisting of graphene, single or multi-wall native or derivatized carbon nanotubes, semiconducting materials, core-shell conductive nanoparticles, organic conductive materials or polymers or co-polymers thereof, organic or inorganic ionic salts or materials, conductive colloids, ionic resins, acrylate materials, and mixtures thereof, wherein:
   the antistatic layer comprises a thickness ranging from 100 nm to 1 μm;
   said antistatic laminate film structure comprises an antistatic enhancing layer that is applied on top of, or subjacent to, said antistatic layer, said antistatic enhancing layer comprising siloxanes, non-conductive metal oxides, nanoparticles, or poly(ethylene glycol) copolymers, wherein said antistatic enhancing layer augments the antistatic activity of the antistatic layer; and
   the antistatic film comprises a relative light transmission factor in the visible spectrum, Tv, that is greater than 90%.

2. The antistatic film structure of claim 1, wherein the transparent support structure comprises a polymer selected from the group consisting of native or derivatized cellulose or cellulosic material, polyesters, polyvinyl acetates, polyacrylonitriles, polybutadienes, polystyrenes, polycarbonates, polyacrylates, copolymers and mixtures thereof.

3. The antistatic film structure of claim 2, wherein the derivatized cellulose is selected from the group consisting of cellulose alkyl ethers, cellulose hydroxyalkyl ethers, cellulose esters, cellulose functionalized with anionic or cationic functional groups, crosslinked cellulose, and combinations thereof.

4. The antistatic film structure of claim 1, wherein the antistatic film structure further comprises a polarizing element.

5. The antistatic film structure of claim 4, wherein the polarizing element comprises polyvinyl alcohol film.

6. The antistatic film structure of claim 3, wherein the cellulose ester is cellulose triacetate.

7. The antistatic film structure of claim 1, wherein the inorganic ionic salt or material comprises vanadium oxide, antimony oxide, tantalum oxide, cerium oxide, tin oxide, titanium oxide, indium oxide, zinc oxide, tin-doped indium oxide, antimony-doped tin oxide, fluorine-doped tin oxide, phosphorus-doped tin oxide, zinc antimonide, indium antimonide, indium-doped zinc oxide, lithium salts, silver, gold, nickel, aluminum, silicon nitride, magnesium fluoride, or combinations thereof.

8. The antistatic film structure of claim 1, comprising a haze value of less than 1.0%.

9. The antistatic film structure of claim 8, comprising a haze value of less than 0.5%.

10. A method for producing an antistatic film structure having a relative light transmission factor in the visible spectrum, Tv, that is greater than 90% comprising combining a transparent support structure and an antistatic layer comprising at least one antistatic component selected from the group consisting of graphene, single or multi-wall native or derivatized carbon nanotubes, semiconducting materials, core-shell conductive nanoparticles, organic conductive materials or polymers or co-polymers thereof, organic ionic salts or inorganic ionic salts or materials, conductive colloids, ionic resins, and mixtures thereof, wherein:
   the antistatic layer comprises a thickness ranging from 100 nm to 1 μm;
   said antistatic laminate film structure comprises an antistatic enhancing layer that is applied on top of, or subjacent to, said antistatic layer, said antistatic enhancing layer comprising siloxanes, non-conductive metal oxides, nanoparticles, or poly(ethylene glycol) copolymers, wherein and said antistatic enhancing layer augments the antistatic activity of the antistatic layer; and
   the antistatic film comprises a relative light transmission factor in the visible spectrum, Tv, that is greater than 90%.

11. The method of claim 10, wherein combining the transparent support structure and the antistatic layer comprises applying the antistatic layer to the transparent support structure by spraying, coating, dipping, spin-coating, flow coating, ink-jetting, painting, printing, sputtering, plasma depositing, electrochemical vapor depositing, or vacuum depositing antistatic material onto the transparent support structure.

12. The method of claim 10, wherein the transparent support structure comprises a polymer selected from the group consisting of native or derivatized cellulose, polyesters, polyvinyl acetates, polyacrylonitriles, polybutadienes, polystyrenes, polycarbonates, polyacrylates, copolymers and mixtures thereof.

13. The method of claim 12, wherein the derivatized cellulose is cellulose triacetate.

14. The method of claim 10, wherein the method further comprises combining a polarizing element with the antistatic film structure.

15. The method of claim 14, wherein the polarizing element comprises polyvinyl alcohol film.

16. The antistatic laminate film structure of claim 1, wherein the nanoparticles comprise $SiO_2$ or $Al_2O_3$.

17. The antistatic laminate film structure of claim 1, wherein the antistatic enhancing layer further comprises diethylene glycol, diethylene glycol monoether, diethylene glycol diether, an oligomer thereof, a polymer thereof, or any combination thereof.

18. The antistatic laminate film structure of claim 17, wherein the antistatic enhancing layer further comprises from about 1 wt. % to about 10 wt. % of diethylene glycol, diethylene glycol monoether, diethylene glycol diether, an oligomer thereof, a polymer thereof, or any combination thereof, based on the weight of the antistatic enhancing layer.

19. The method laminate film structure of claim 10, wherein the nanoparticles comprise $SiO_2$ or $Al_2O_3$.

20. The antistatic laminate film structure of claim 10, wherein the antistatic enhancing layer further comprises diethylene glycol, diethylene glycol monoether, diethylene glycol diether, an oligomer thereof, a polymer thereof, or any combination thereof.

* * * * *